(12) United States Patent
Komaki et al.

(10) Patent No.: US 7,055,162 B2
(45) Date of Patent: May 30, 2006

(54) OPTICAL INFORMATION MEDIUM AND MAKING METHOD

(75) Inventors: Tsuyoshi Komaki, Tokyo (JP); Kenji Yamaga, Tokyo (JP); Hideki Hirata, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/091,766

(22) Filed: Mar. 29, 2005

(65) Prior Publication Data

US 2005/0167869 A1 Aug. 4, 2005

Related U.S. Application Data

(62) Division of application No. 09/875,974, filed on Jun. 8, 2001, now Pat. No. 6,898,796.

(30) Foreign Application Priority Data

Jun. 9, 2000 (JP) ............................. 2000-174541
May 17, 2001 (JP) ............................. 2001-148523

(51) Int. Cl.
*G11B 7/24* (2006.01)
*B29D 17/00* (2006.01)

(52) U.S. Cl. ..................... 720/724; 264/1.33
(58) Field of Classification Search .................. None
See application file for complete search history.

(56) References Cited

U.S. PATENT DOCUMENTS

| 5,188,863 | A | 2/1993 | de Graaf et al. |
| 5,714,222 | A | 2/1998 | Yokoyama |
| 6,349,086 | B1 | 2/2002 | Nishida et al. |
| 6,613,396 | B1 | 9/2003 | Nishida et al. |
| 6,844,045 | B1 | 1/2005 | Komaki et al. |
| 2004/0196777 | A1 | 10/2004 | Komaki et al. |
| 2004/0233830 | A1 | 11/2004 | Usami et al. |
| 2004/0246884 | A1 | 12/2004 | Komaki et al. |
| 2004/0258871 | A1 | 12/2004 | Mizushima et al. |
| 2005/0001343 | A1 | 1/2005 | Komaki et al. |

FOREIGN PATENT DOCUMENTS

| JP | 403083238 | 4/1991 |
| JP | 403088148 | 4/1991 |
| JP | 405159394 | 6/1993 |
| JP | 405325287 | 12/1993 |

(Continued)

OTHER PUBLICATIONS

U.S. Appl. No. 10/518,388, filed Dec. 30, 2004, unknown.

(Continued)

*Primary Examiner*—Allen Cao
(74) *Attorney, Agent, or Firm*—Oblon, Spivak, McClelland, Maier & Neustadt, P.C.

(57) ABSTRACT

An optical information medium includes a disk-shaped substrate (100) having a center hole (101), an annular information recording area thereon, and an annular resin-based light-transmitting layer (102) thereon by which recording/reading laser beam is transmitted to the information recording area. The light-transmitting layer (102) terminates at a radially inner periphery which forms an annular raised rim (6). The rim is effective for protecting the light-transmitting layer from damages and dust adhesion, and when a plurality of such media are stacked, preventing the media from intimate contact.

7 Claims, 4 Drawing Sheets

FOREIGN PATENT DOCUMENTS

| | | |
|---|---|---|
| JP | 407065526 | 3/1995 |
| JP | 408077629 | 3/1996 |
| JP | 10-249264 | 9/1998 |
| JP | 10-289489 | 10/1998 |
| JP | 10-320850 | 12/1998 |
| JP | 11-195250 | 7/1999 |
| JP | 11-195251 | 7/1999 |

OTHER PUBLICATIONS

U.S. Appl. No. 11/091,766, filed Mar. 29, 2005, Komaki et al.

OPTICAL INFORMATION MEDIUM AND MAKING METHOD

This invention relates to optical information media such as read-only optical disks and optical recording disks, and a method for preparing the same.

BACKGROUND OF THE INVENTION

To record and store a vast quantity of information as typified by moving image information, advanced optical information media such as read-only optical disks and optical recording disks are required to increase their recording density for increasing the capacity. To meet such a demand, engineers have been engaged in the research and development works targeting a higher recording density.

One such approach relating to digital versatile disks (DVD) is to shorten the wavelength of a recording/reading laser beam and increase the numerical aperture (NA) of a recording/reading optical system objective lens, thereby reducing the spot diameter of the recording/reading laser beam. As compared with CD, DVD is successful in achieving a recording capacity of 6 to 8 folds (typically 4.7 GB/side) by changing the recording/reading wavelength from 780 nm to 650 nm and the NA from 0.45 to 0.6.

Increasing the NA, however, leads to a reduced tilt margin. The tilt margin is a permissible tilt of an optical recording medium relative to an optical system, which depends on the NA. The tilt margin is in proportion to $$\lambda/(d \cdot NA^3)$$

wherein $\lambda$ denotes the wavelength of recording/reading beam and "d" denotes the thickness of a transparent substrate the recording/reading beam enters. If the optical recording medium is inclined or tilted relative to the laser beam, a wavefront aberration (or coma) occurs. The coefficient of wavefront aberration is represented by $$(\tfrac{1}{2}) \cdot d \cdot \{n^2 \cdot \sin\theta \cdot \cos\theta\} \cdot NA^3/(n^2 - \sin^2\theta)^{-5/2}$$

wherein n denotes the refractive index of the substrate and $\theta$ is a tilt angle. It is appreciated from these formulae that the tilt margin may be increased and the occurrence of comatic aberration be suppressed by reducing the thickness "d" of the substrate. In fact, the DVD design is such that a tilt margin is secured by reducing the thickness of the substrate to about one half (about 0.6 mm) of the thickness (about 1.2 mm) of the CD substrate.

To record moving images of better quality for a longer period of time, there has been proposed a structure allowing for use of a thinner substrate. In this structure, a substrate of an ordinary thickness is used as a supporting substrate for maintaining rigidity, pits or a recording layer is formed on the surface of the supporting substrate, and a light-transmitting layer of about 0.1 mm thick is formed thereon as a thin substrate. Recording/reading beam reaches the pits or recording layer through the light-transmitting layer. This structure can achieve a higher recording density due to a greater NA because the substrate can be made extremely thin as compared with the prior art. Media having such structure are disclosed in JP-A 10-320859 and 11-120613.

The provision of a light-transmitting layer of approximately 0.1 mm thick allows for use of an objective lens having a large numerical aperture NA, say about 0.85.

Where optical disks are used without being enclosed within cartridges or optical disks can be taken out of cartridges, the light-transmitting layer has the frequent risk of damage and dust deposition on its surface. In the case of optical information media having a thin light-transmitting layer of about 0.1 mm thick, such damage and dust deposition on the surface of the light-transmitting layer have a substantial influence on recording and reading characteristics, as compared with prior art optical information media of the type wherein laser beam is transmitted by a transparent substrate of about 0.6 to 1.2 mm thick.

When optical disks are temporarily stored in their manufacturing process, pin stockers are often used. A plurality of optical disks are vertically stacked on the pin stocker for storage, with the pin inserted into the center holes of the disks. During the pin stocker storage, substantial loads are applied to lower side optical disks so that these disks are brought into intimate contact, possibly leaving contact traces on the disk surface. A common countermeasure is to insert spacers between adjacent disks for preventing the disks from intimate contact. Since contact traces, if imprinted on the surface of the thin light-transmitting layer, will adversely affect recording and reading characteristics, it is important to prevent those disks having a thin light-transmitting layer from mutual intimate contact. The operation of interleaving spacers between adjacent disks, however, is cumbersome and detracts from productivity.

SUMMARY OF THE INVENTION

An object of the invention is to provide an optical information medium comprising a supporting substrate, an information recording area thereon, and a light-transmitting layer thereon by which recording/reading laser beam is transmitted to the information recording area, wherein provision is made such as to prevent the light-transmitting layer from being damaged or receiving dust deposits, and when a plurality of such media are stacked, to prevent the media from intimate contact.

In one aspect, the invention provides an optical information medium comprising a disk-shaped supporting substrate having a center hole, an annular information recording area thereon, and an annular resin-based light-transmitting layer on the information recording area by which recording/reading laser beam is transmitted to the information recording area. The light-transmitting layer terminates at a radially inner periphery which forms an annular raised rim.

Preferably, the annular raised rim is 5 to 300 μm higher than the nearby surface of the light-transmitting layer; and the light-transmitting layer has a thickness of 30 to 300 μm.

Another aspect of the invention provides a method for preparing the optical information medium defined above. A first embodiment involves the steps of mounting a substrate in the form of the supporting substrate having the information recording area borne thereon on a rotating table, closing the center hole with a plug means having a disk member, feeding a coating fluid containing a resin onto the disk member, and thereafter rotating the substrate together with the plug means for thereby spreading the coating fluid over the substrate to form an annular resin layer; removing the plug means from the substrate; and then curing the resin layer to form the light-transmitting layer. In the step of removing the plug means from the substrate, the resin layer is built up at the radially inner periphery thereof to form the annular raised rim.

Preferably in the step of removing the plug means from the substrate, the resin layer has a viscosity of 500 to 100,000 centipoise. Also preferably, the step of curing the resin layer is started within 0.5 to 10 seconds from the step of removing the plug means from the substrate.

The substrate may be kept stationary for the duration from the step of removing the plug means from the substrate to the completion of the step of curing the resin layer; alternatively, the substrate may be rotated at a rotational speed of up to 120 rpm for at least a portion of the duration from the step of removing the plug means from the substrate to the completion of the step of curing the resin layer.

A second embodiment of the method for preparing the optical information medium defined above involves the step of mounting a substrate in the form of the supporting substrate having the information recording area borne thereon on a rotating table, closing the center hole with a plug means having a disk member, feeding a coating fluid containing an actinic radiation-curable resin onto the disk member, and thereafter rotating the substrate together with the plug means for thereby spreading the coating fluid over the substrate to form an annular resin layer; the first curing step of irradiating actinic radiation to the resin layer for curing except a region thereof surrounding the radially inner periphery thereof, while the substrate is being rotated together with the plug means; the step of removing the plug means from the substrate; and the second curing step of irradiating active radiation to at least the region of the resin layer surrounding the inner periphery thereof for curing to form the light-transmitting layer. In the first curing step, the rotation of the plug means causes a portion of the resin on the disk member of the plug means to move toward the inner periphery of the resin layer whereby the resin layer is built up at the inner periphery thereof to form the annular raised rim. Preferably, the plug means further includes a support shaft having one end integrally joined to the disk member at its center and another end, and a circular mask member integrally joined to the support shaft near the other end and concentrically with the disk member and having a larger radius than the disk member. The mask member serves to shield the actinic radiation irradiated in the first curing step.

FUNCTION AND RESULTS

Figure 10:
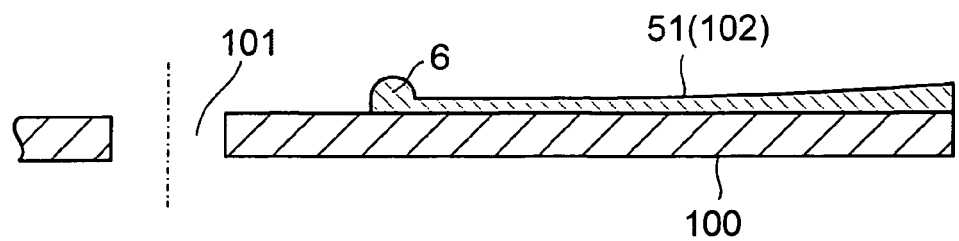
FIG. 10 is a schematic cross-sectional view of a resin layer or light-transmitting layer on a disk substrate.

As best shown in FIG. 10, the optical information medium of the invention has an annular resin-based light-transmitting layer 102 on a disk substrate 100 having a center hole 101. The light-transmitting layer 102 terminates at its radially inner periphery to form an annular raised rim 6. The radially inner periphery of the annular information recording area (not shown) is located radially outside the annular raised rim 6. The annular raised rim 6 is the region where the resin constituting the light-transmitting layer is continuously built up. The medium of the invention, wherein the inner periphery of the light-transmitting layer is constructed by the annular raised rim 6, can protect the flat region of the light-transmitting layer 102 from damages or dust adhesion, even when the medium is rested on a contaminated area with its light-transmitting layer 102 faced down. When a plurality of media are stacked, the presence of the annular raised rim 6 prevents the light-transmitting layer from closely contacting the adjacent medium, eliminating a need for a spacer between adjacent media.

The annular raised rim 6 can be formed integral with the light-transmitting layer during its formation.

Figure 3:
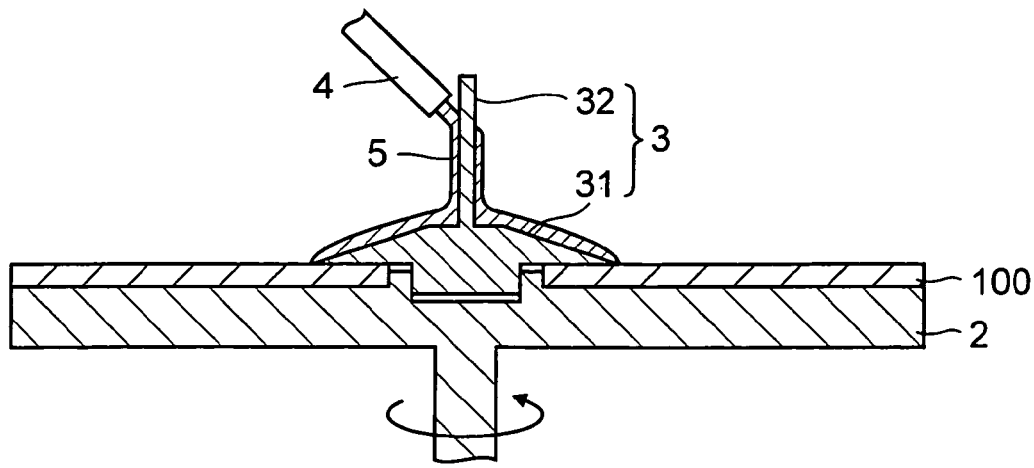
Figure 4:
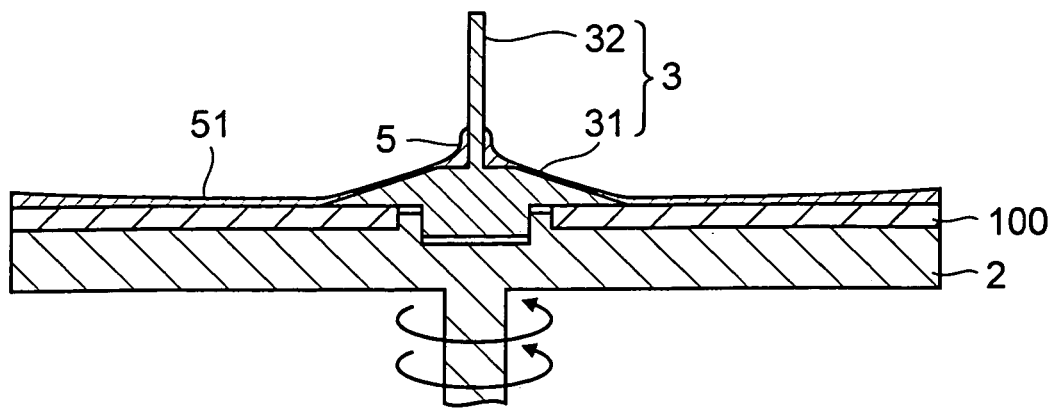
Figure 5:
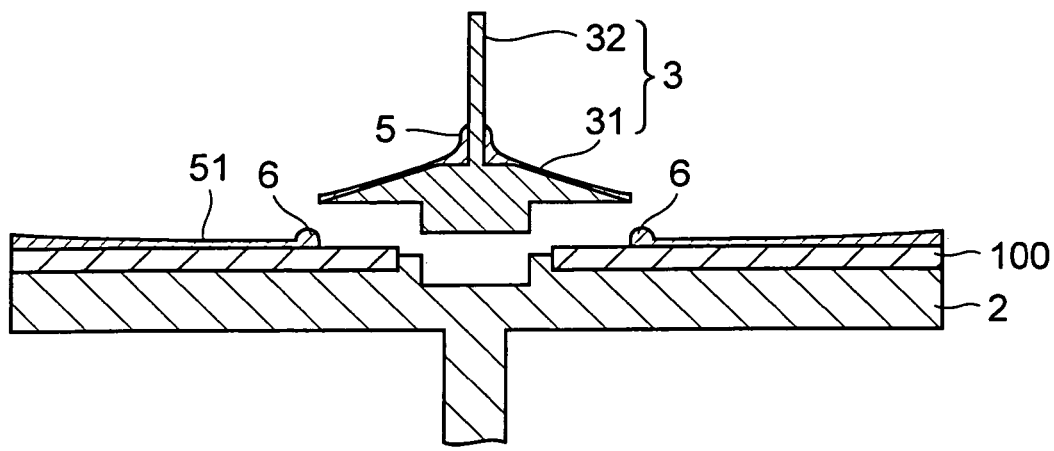

In the first embodiment of the method of the invention, once the center hole 101 of the disk substrate 100 is closed with a disk member 31 of a plug means 3, a coating fluid 5 containing a resin is fed onto the disk member 31 as shown in FIG. 3. Spin coating is then performed to spread the coating fluid 5 to form an annular resin layer 51 on the disk substrate 100 as shown in FIG. 4 (resin casting step). Then, the plug means 3 is removed from the disk substrate 100 as shown in FIG. 5 (plug means removing step). As a result of the plug means removing step, the radially inner periphery of the resin layer 51 is built up to form the annular raised rim 6 at the inner periphery of the resin layer 51 as shown in FIG. 5. The resin layer 51 is then cured, obtaining the light-transmitting layer having the annular raised rim at its inner periphery (curing step).

Figure 7:
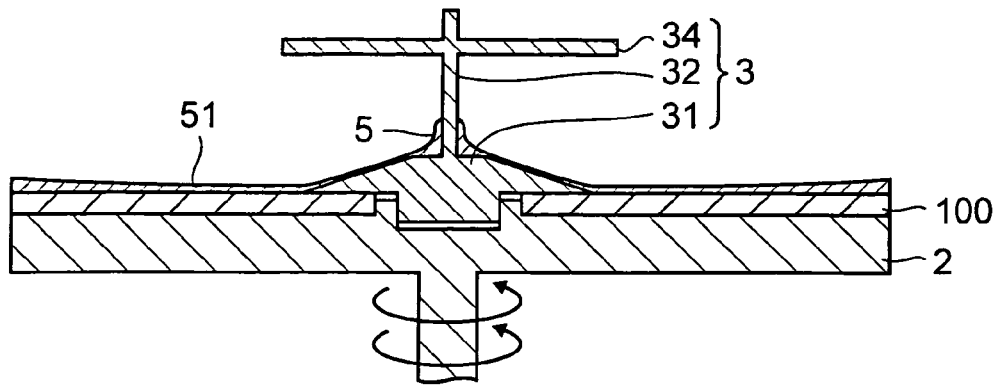
FIGS. 7 through 9 are schematic cross-sectional views illustrating successive steps in a process of forming a light-transmitting layer according to the second step.
Figure 8:
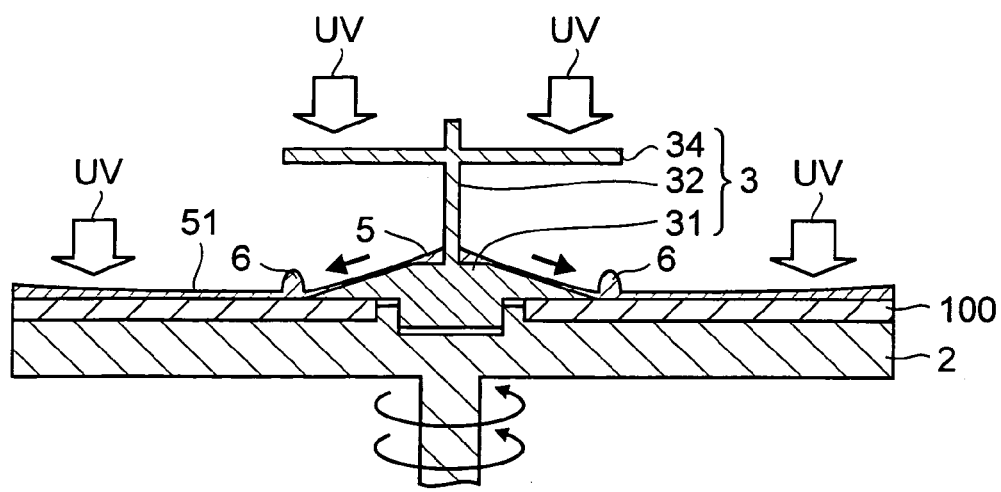
Figure 9:
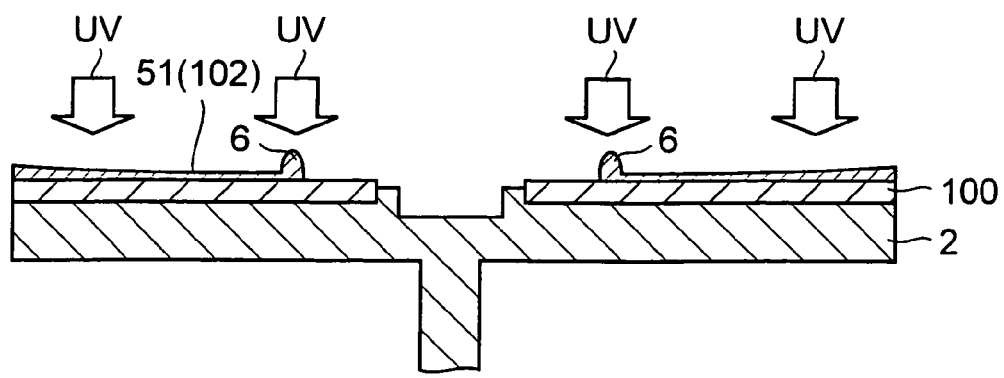

In the second embodiment of the method of the invention, using a coating fluid containing a resin which is curable upon exposure to active energy or actinic radiation such as ultraviolet (UV) radiation, an annular resin layer 51 is formed in the same manner as in the first embodiment and as shown in FIG. 7 (resin casting step). Then, while the disk substrate 100 is being rotated together with the plug means 3, actinic radiation is irradiated to the resin layer 51 except its inner periphery-surrounding region as shown in FIG. 8, for curing the resin layer 51 (first curing step). It is noted that in the first curing step, actinic radiation is not irradiated to the resin 5 on the disk member 31 of the plug means 3. In FIG. 8, the plug means 3 including a circular mask member 34 having a larger radius than the disk member 31 is used so that the mask member 34 serves to shield from the actinic radiation the inner periphery-surrounding region of the resin layer 51 and the disk member 31. Since the resin 5 on the disk member 31 is not cured in the first curing step, part of the resin flows on the disk member 31 in the direction of arrow in FIG. 8 under the centrifugal force resulting from rotation, moving toward the inner periphery of the resin layer 51. On the other hand, the region of the resin layer 51 excluding the inner periphery does not flow under the centrifugal force because it has been cured. As a result, the resin which has moved from the disk member 31 toward the inner periphery of the resin layer 51 is retained thereat, forming an annular build-up near the inner periphery of the resin layer 51, which becomes the annular raised rim 6. The plug means 3 is then removed from the disk substrate 100 (plug means removing step). Thereafter, as shown in FIG. 9, actinic radiation is irradiated to at least the inner periphery-surrounding (or uncured) region of the resin layer 51 for curing, obtaining the light-transmitting layer 102 (second curing step).

As compared with the first embodiment, the second step allows the annular raised rim 6 to be raised higher. The height of the annular raised rim 6 can be adjusted by controlling the rotational speed and time in the first curing step.

The invention is advantageous from the productivity aspect since the annular raised rim can be formed simultaneously with the formation of the light-transmitting layer. Since the annular raised rim thus formed continues throughout the inner periphery of the light-transmitting layer, it is resistant to collapse under stresses from above. Then the annular raised rim does not readily lose the effects of preventing the light-transmitting layer from damages or debris adhesion. Even when substantial loads are applied in a stack of numerous media, the intimate contact between media is effectively prohibited.

DESCRIPTION OF THE PREFERRED EMBODIMENTS

Figure 12:
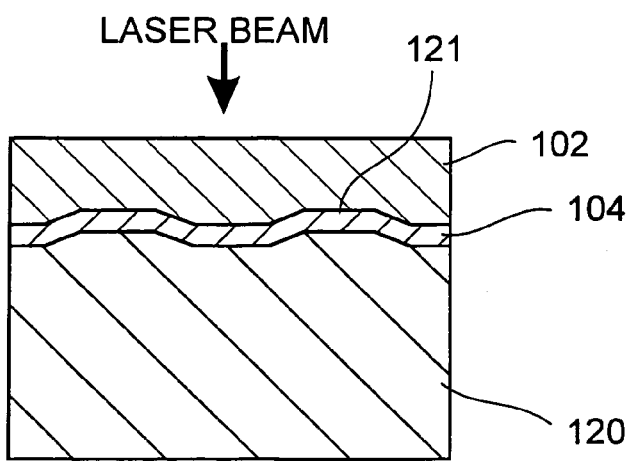
FIG. 12 is a fragmentary cross-sectional view of an optical information medium.

Referring to FIG. 12, there is schematically illustrated one exemplary construction of an optical information medium according to the invention. The optical information medium illustrated is a recording medium comprising a supporting substrate 120, a recording layer 104 as an information recording area on the supporting substrate 120, and a light-transmitting layer 102 on the recording layer 104. Recording/reading laser beam reaches the recording layer 104 through the light-transmitting layer 102.

The invention is applicable to any type of recording layer. Specifically, the invention is applicable to phase change recording media, pit formation type recording media, and magneto-optical recording media, for example. In general, additional layers such as a dielectric layer and a reflective layer are provided on at least one side of the recording layer for the purposes of protecting the recording layer and achieving optical effects, although they are omitted in FIG. 12. The invention is not limited to the recordable type, and may also be applicable to the read-only type. In the latter case, the information recording area is constructed by a row of pits formed integrally in the supporting substrate 120 or a reflective layer formed contiguous thereto. It is noted that the reflective layer is usually constructed by a metal film, metalloid film or multilayer dielectric film.

Now the process of forming the light-transmitting layer is described.

Figure 1:
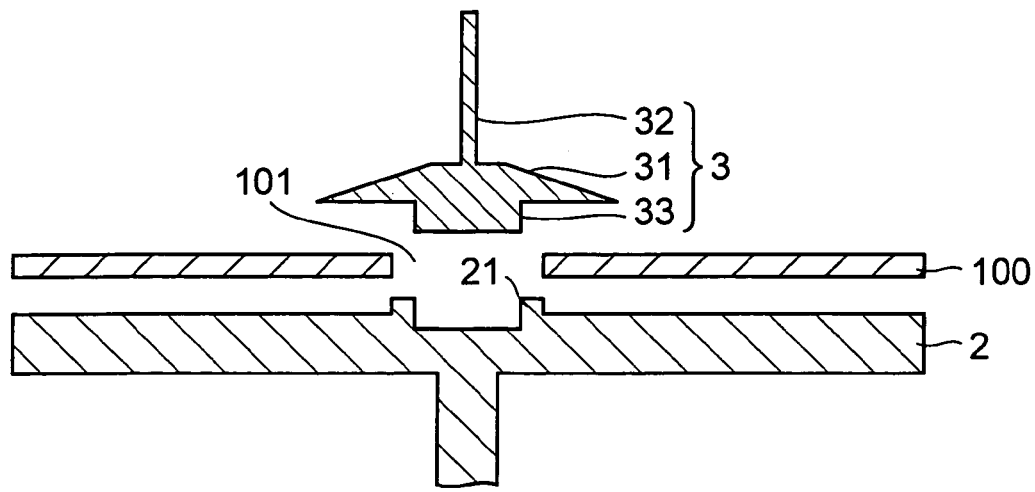
FIGS. 1 through 6 are schematic cross-sectional views illustrating successive steps in a process of forming a light-transmitting layer according to the first embodiment.
Figure 2:
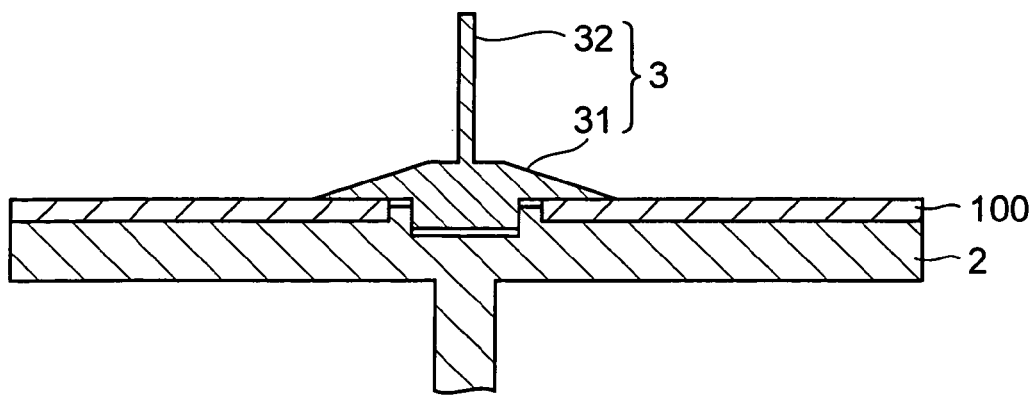

In the first embodiment, as shown in FIGS. 1 and 2, a disk substrate 100 is rested on a rotating table 2. The disk substrate 100 is a supporting substrate having an information recording area borne thereon and has a center hole 101. The disk substrate 100 is secured by tightly fitting the center hole 101 on an annular raised rim 21 of the rotating table 2. FIGS. 1 and 2 are cross-sectional views showing only planes appearing in cross section, with any backward portion being omitted. This rule of illustration is the same throughout the cross-sectional views.

Next, the center hole 101 is closed with a plug means 3. The plug means 3 includes a disk member 31 for closing the center hole 101, an integral support shaft 32 extending upright from the disk member 31 at the center thereof, and an integral back projection 33 extending downward from the disk member 31 on the side facing the center hole 101. By engaging the projection 33 into the annular raised rim 21 of the rotating table 2, the plug means 3 is secured to the rotating table 2 and aligned with the disk substrate 100. It is not critical how to secure the disk substrate 100 and the plug means 3 to the rotating table 2. In one alternative securing procedure, the disk substrate 100 is first engaged with the plug means 3 which is, in turn, engaged with the rotating table 2.

Next, a coating fluid 5 in the form of a resin or resin solution is injected from a nozzle 4 to the outer periphery of the support shaft 32 as shown in FIG. 3. At this point, the rotating table 2 is rotated at a relatively low speed, preferably about 20 to 100 rpm, so that the coating fluid may be uniformly spread over the disk member 31. The resin used herein is not critical although it is typically selected from actinic radiation-curable resins and thermosetting resins. Of these, actinic radiation-curable resins, especially UV curable resins are preferred. The term "actinic radiation" used herein means electromagnetic waves and particle beams commonly used in the curing of resins.

Next, as shown in FIG. 4, the rotating table 2 is rotated at a relatively high speed to cast the coating fluid 5 over the disk substrate 100 for forming a resin layer 51 on the disk substrate 100.

Figure 6:
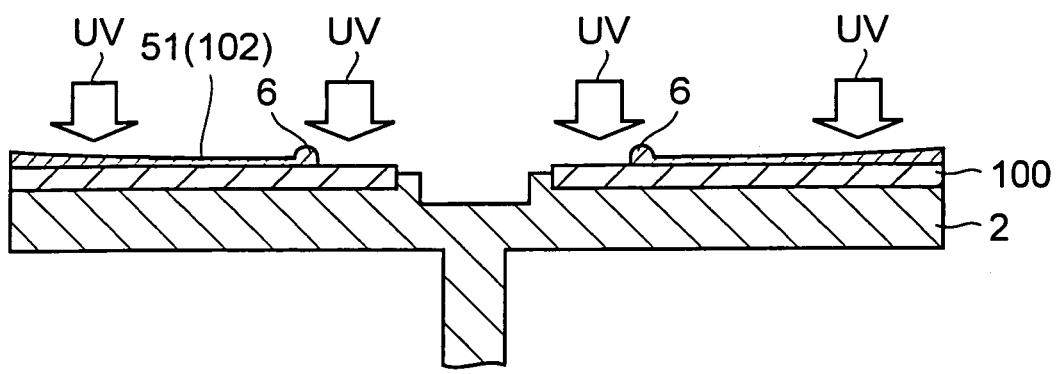

Next, the plug means 3 is detached from the disk substrate 100 as shown in FIG. 5. At this point, an annular raised rim 6 is formed at the radially inner periphery of the resin layer 51. In case the coating fluid contains a UV curable resin, after the plug means 3 is removed, the resin layer 51 is exposed to UV radiation as shown in FIG. 6 whereby the resin layer 51 is cured into a light-transmitting layer 102. In FIG. 6, UV radiation is irradiated to the resin layer 51 on the rotating table 2. In an alternative embodiment, the substrate 100 is transferred from the rotating table 2 to a curing station where curing is carried out.

If the disk substrate 100 is rotated at a relatively high speed for the entirety or a portion of the duration from the removal of the plug means 3 to the completion of curing of the resin layer 51, the resin to form the annular raised rim 6 is moved radially outward under the centrifugal force and as a result, the annular raised rim 6 is leveled, that is, becomes short. Therefore, it is preferred that the disk substrate 100 be not rotated for that duration. If the disk substrate 100 is kept stationary, the resin to form the annular raised rim can flow radially inward of the light-transmitting layer to bring out a moderate degree of leveling. To avoid such leveling, it is recommended that the disk substrate 100 be rotated at a relatively low speed for the entirety or a portion of that duration, especially during the curing step. The rotational speed employed for this purpose is preferably 120 rpm or lower, and especially 100 rpm or lower. Too high a rotational speed can cause the outward flow and leveling of the rim-forming resin, negating the desired effect. Too low a rotational speed is less effective for suppressing the leveling of the rim-forming resin by inward flow. Then the rotational speed is preferably at least 30 rpm, and especially at least 50 rpm. It is acceptable that the plug means be removed while the disk substrate is being rotated, preferably at a rotational speed within the above range.

The annular raised rim 6 formed by the above process has a smooth curvilinear or arcuate profile in cross section as illustrated. In contrast, if the plug means 3 is removed after the resin layer 51 has been cured, an annular continuous raised rim is not formed. Even when raised portions are formed, they are fins or burrs, but not a circumferentially continuous annular raised rim. Another problem is that the cured resin positioned adjacent the plug means is broken into fragments which will scatter on the disk substrate 100.

The spin coating conditions of the coating fluid are not critical. It is known that in the spin coating technique using the same conditions other than the viscosity of the coating fluid, the thickness of the coating is theoretically in proportion to the square root of the viscosity of the coating fluid. On the other hand, the higher the rotational speed, and the longer the rotating time, the thinner becomes the coating. Therefore, the rotational speed (rpm) and rotating time during the spin coating are determined as appropriate depending on the thickness of the resin layer 51 to be formed and the viscosity of the coating fluid. When it is desired to form a light-transmitting layer having a thickness of about 30 to 300 μm, it is recommended that the viscosity of the coating fluid be selected in the range of about 100 to 100,000 centipoise, the rotational speed be selected in the range of about 500 to 6,000 rpm, and the rotating time be selected in the range of about 2 to 10 seconds.

The invention requires that the annular raised rim 6 be formed at the inner periphery of the resin layer 51 when the plug means 3 is removed from the disk substrate 100. To this end, the resin layer 51 should preferably have a viscosity of 500 to 100,000 centipoise, especially 1,000 to 50,000 centipoise upon removal of the plug means 3. Too low a viscosity of the resin layer upon plug removal may make it difficult to form an annular raised rim of sufficient height. If the viscosity of the resin layer is too high, the removal of the plug means is accompanied by stringing of the resin, making it difficult to form the annular raised rim to a round profile.

If the resin layer 51 is allowed stand after its formation, leveling occurs with time so that the annular raised rim 6 becomes short. For this reason, the curing of the resin layer 51 is preferably started within 0.5 to 10 seconds, more preferably within 2 to 6 seconds from the removal of the plug means 3 to form the annular raised rim 6.

When the light-transmitting layer is formed by the spin coating technique, the light-transmitting layer generally becomes thicker in a region near its outer periphery, which can sometimes adversely affect the recording and reading characteristics. In one possible measure to avoid such inconvenience, a disk substrate having a somewhat larger diameter than the desired diameter is used, and the outer periphery of the medium is ground off after the formation of the light-transmitting layer, thereby preventing the light-transmitting layer from becoming too thick near the outer periphery of the information recording area.

Next, referring to FIGS. 7 to 9, the second embodiment is described. Like FIG. 4 in the first embodiment, FIG. 7 illustrates the resin spreading step. The plug means 3 shown in FIG. 7 includes a disk member 31, a support shaft 32 having a bottom end integrally joined to the disk member 31 at its center and a top end, and a circular mask member 34 integrally joined to the support shaft 32 near its top end. The mask member 34 is concentric with the disk member 31 and has a larger radius than the disk member 31.

Once the resin layer 51 is formed in FIG. 7, UV radiation is irradiated from above as shown in FIG. 8 while the disk substrate 100 is rotated together with the plug means 3. Since the UV is shielded by the mask member 34, the inner periphery-surrounding region of the resin layer 51 and the resin 5 on the disk member 31 are not cured, but the resin layer 51 except its inner periphery-surrounding region is cured. This is the first curing step. Through the same mechanism as mentioned previously, an annular build-up is created at the radially inner periphery of the resin layer 51 to form the annular raised rim 6. The difference in radius between the mask member 34 and the disk member 31 is not critical, and may be determined as appropriate depending on the width and height of the annular raised rim 6 to be formed. Usually the difference in radius is 0.2 to 2 mm, preferably 0.5 to 1.5 mm. With too small a difference, the resin layer 51 is cured to a position very close to its inner periphery so that the formation of the annular raised rim 6 might be impeded. With too large a difference, the resin layer 51 remains uncured to a position far remote from its inner periphery, so that the resin 5 having flowed from the disk member 31 toward the inner periphery of the resin layer 51 is not dammed near the inner periphery of the resin layer 51 so that the formation of the annular raised rim 6 might be impeded as well.

In the first curing step, UV radiation is irradiated preferably while the disk substrate 100 and plug means 3, which have been rotated in the resin spreading step, are kept rotated. Differently stated, UV radiation is preferably irradiated immediately before the completion of spin coating so that the resin spreading step is directly followed by the first curing step. It is noted that the number of revolutions in the first curing step is set lower than that in the resin spreading step, if desired. It is also possible that after spreading of the resin, UV radiation is irradiated thereto while the number of revolutions is gradually reduced. The height of the annular raised rim 6 can be adjusted by controlling the rotational speed and time in the first curing step. Preferably, the number of revolutions in the first curing step is at least 40%, more preferably at least 60% of that in the resin spreading step. If the number of revolutions in the first curing step is too low, it may be difficult to form the annular raised rim 6. The time of the first curing step, that is, the time span for sustaining rotation of the disk substrate during UV exposure is preferably 0.5 to 2 seconds. If the time span is too short, the resin may not flow fully, with difficulty to form the annular raised rim 6. If the time span is too long, more resin may accumulate near the inner periphery of the resin layer 51 and the accumulated resin is not retained by the cured region of the resin layer, but overflows, resulting in difficulty to form the annular raised rim 6.

In the second embodiment, the means for irradiating UV radiation to the resin layer 51 except the region thereof surrounding the inner periphery and the resin 5 on the disk member 31 is not critical. Although the plug means 3 in FIG. 8 is integrally provided with the mask member 34 which functions as a mask upon UV irradiation, a mask may be separately disposed above the plug means whereupon UV radiation is evenly irradiated from above. Instead of the mask, a UV irradiating means capable of irradiating only a selected region with UV radiation may also be used.

After the plug means 3 is removed from the disk substrate 100, UV radiation is irradiated to at least the inner periphery-surrounding region (uncured region) of the resin layer 51 for curing the resin layer 51 into the light-transmitting layer 102 as shown in FIG. 9 (second curing step). To completely cure the entire light-transmitting layer 102, it is preferred that in the second curing step, UV radiation be irradiated over the entire surface of the resin layer 51.

As previously described, in order to prevent the annular raised rim 6 from leveling, the first embodiment favors that the disk substrate 100 be kept stationary or rotated at a relatively low speed for the duration from the removal of the plug means 3 to the completion of curing of the resin layer 51. Also in the second embodiment, in order to prevent the annular raised rim 6 from leveling, the disk substrate 100 is preferably kept stationary or rotated at a relatively low speed for the duration from the removal of the plug means 3 to the completion of curing of the annular raised rim 6 in the second curing step.

At the end of curing, the height of the annular raised rim 6, that is, the (vertical) distance from the lowest surface of the light-transmitting layer near the rim to the crest of the rim is preferably at least 5 µm, more preferably at least 10 µm, and most preferably at least 25 µm. If the annular raised rim is too short, it becomes less effective. It is difficult to form an very high annular raised rim. Specifically, the annular raised rim formed in the first embodiment generally has a height of up to 100 µm, and often up to 50 µm. The annular raised rim formed in the second embodiment generally has a height of up to 300 µm, and often up to 200 µm. The (radial) width of the annular raised rim is preferably 0.5 to 3 mm, and more preferably 1 to 2.5 mm. If the annular raised rim is too narrow, its mechanical strength may become low. Either of the above-described processes is difficult to form the annular raised rim to a width beyond the above range. Additionally, the annular raised rim with a too much width may undesirably overlap the information recording area. It is noted that as the light-transmitting layer becomes thicker, it becomes easier to increase the height and width of the annular raised rim. The annular raised rim of the above-defined dimensions can be readily formed by either of the above-described processes when the light-transmitting layer is 30 to 300 µm thick.

As long as the plug means used herein has at least a disk member adapted to close the center hole of the disk substrate, the remaining construction of the plug means is not critical. The technique of spin coating using a plug means for closing the center hole of the disk substrate is disclosed, for example, in JP-A 10-320850, 10-249264, 10-289489, 11-195250, and 11-195251. For the purpose of reducing the radial thickness variation of the light-transmitting layer, these patent publications show to close the center hole of the disk substrate with suitable plug means such as a plate member, disk member, plug or cap so that the resin can be fed near the center of the plug means, that is, the center of rotation.

However, the techniques of JP-A 10-320850, 10-249264, and 11-195250 are difficult to practice in the industry because it is not described how to remove the plug means such as the plate member or cap at the end of spin coating. These publications do not describe that the resin layer should be cured after removal of the plug means from the disk substrate or suggest the annular raised rim to be formed at the inner periphery of the resin layer.

JP-A 10-289489 describes that at the end of spin coating, the plug means such as the disk member is removed by punching out or magnetic attraction using an electromagnet and that the resin layer is then cured while the disk substrate is rotated. However, this publication does not suggest the annular raised rim to be formed at the inner periphery of the resin layer. No reference is made to the viscosity of the resin upon removal of the plug means from the disk substrate. When the plug means is removed by punching out or electromagnetic attraction, a substantial acceleration is applied to the plug means, causing a disturbance to the resin coating. Therefore, in fact, the annular raised rim cannot be formed by the method of JP-A 10-289489.

The above-referenced JP-A 11-195251 describes a plug means of the structure having a circular cap and an integral support at the center thereof. The support allegedly facilitates attachment/detachment and alignment of the plug means. The support described therein is a hollow cylinder having at least one discharge port or consists of a plurality of rods. Once a resin is introduced into the interior of the hollow cylinder or the region circumscribed by the rods, the disk substrate is rotated together with the plug means whereby a resin layer is formed on the disk substrate. Finally the plug means can be readily removed. It is described that after the plug means is removed from the disk substrate, the resin layer is cured with the disk substrate kept stationary.

However, JP-A 11-195251 lacks the description about the annular raised rim to be formed at the inner periphery of the resin layer. No reference is made to the viscosity of the resin upon removal of the plug means from the disk substrate.

With this plug means used, spin coating is carried out by causing the resin to flow out of the discharge port in the hollow cylinder or the gaps between the rods. Therefore, the resin is retained or dammed by the support wall (region other than the discharge port) or the rods. The once dammed resin can flash over the disk substrate at incidental timing, frequently forming asperities on the coating. Also the side of the plug means to be in contact with the resin has a complex shape and a large contact area, which is inconvenient at washing the plug means. If some resin is left on the surface of the plug means, the coating frequently becomes uneven. Table 1 of the above-referenced JP-A 11-195251 reports the thickness variations of the coating formed when the outer diameter of the hollow cylinder ranges from 4 mm to 16 mm. It is evident from the test results that the thickness variation of the coating depends on the outer diameter of the hollow cylinder. The larger the outer diameter, the greater becomes the thickness variation. More specifically, even if the resin is fed to the interior of the hollow cylinder, the coating start position is not coincident with the center of rotation, but the outer perimeter of the hollow cylinder. With the relatively high viscosity of the resin taken into account, it is difficult to reduce the outer diameter of the hollow cylinder below 4 mm. The method of this patent publication is thus very difficult to minimize the thickness variation of the resin coating.

As opposed to the prior art plug means, the plug means 3 in FIG. 1, owing to the support shaft 32 on the disk member 31, facilitates the handling of the plug means 3 during the medium preparation process and especially, the removal of the plug means 3 at the end of spin coating. Then, little disturbance is induced at the inner periphery of the resin layer upon removal of the plug means from the disk substrate, and thus, formation of the annular raised rim is easy.

As previously discussed, JP-A 11-195251 describes a plug means of the structure having a circular cap and an integral support in the form of a hollow cylinder or a plurality of rods. The plug means illustrated in FIG. 1 has the following advantages over the plug means of this patent reference.

In JP-A 11-195251, the resin is dammed by the support wall or rods, which can cause thickness variations to the coating. In contrast, with the plug means illustrated in FIG. 1, the coating fluid is fed to the outer periphery of the support shaft, followed by spin coating. This sequence minimizes the thickness variation of the coating. Since the resin is applied to the outer periphery of the support shaft, washing of the plug means illustrated in FIG. 1 is easy as compared with the plug means of JP-A 11-195251. Since a coating fluid having a relatively high viscosity is fed to the interior of the hollow cylindrical support in JP-A 11-195251, the outer diameter of the support cannot be reduced below the limit necessary to maintain the coating fluid flowable. As a result, the coating start position is located relatively far from the center of rotation. In contrast, the plug means illustrated in FIG. 1 allows the outer diameter of the support shaft to be significantly reduced, which also contributes to the minimization of thickness variation of the coating.

Since the above-mentioned advantages are achievable with the plug means having a disk member and a support shaft, the remaining construction of the plug means is not critical. Although the plug means 3 is shown in FIG. 1 as having a frustoconical disk member 31 and a columnar support shaft 32, other plug means as illustrated in FIGS. 11A to 11D can also be used.

Figure 11A:
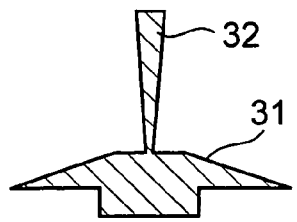
FIGS. 11A to 11D are cross-sectional views illustrating different examples of the plug means.

The plug means shown in FIG. 11A has a frustoconical disk member 31 and an elongated inverted frustoconical (or tapered) support shaft 32. This plug means allows the coating start position of the coating fluid to be located closer to the center of the disk member 31 for further reducing the thickness variation of the coating. Unlike the support shaft 32 which is thin throughout its length, the tapered support shaft 32 invites only a limited decrease of mechanical strength. When the support shaft 32 is clamped by a chuck or the like, the tapered support shaft 32 is unlikely to come out of the chuck, which is advantageous upon detachment and transportation of the plug means. It is noted that the support shaft 32 need not be tapered throughout its length. The requirement is that at least a portion of the support shaft 32 has a frustoconical shape whose diameter gradually decreases toward the disk member 31, and the diameter of the support shaft does not increase in a region thereof located closer to the disk member than said portion.

Figure 11B:
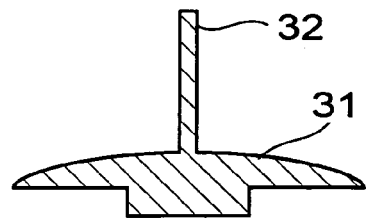
Figure 11C:
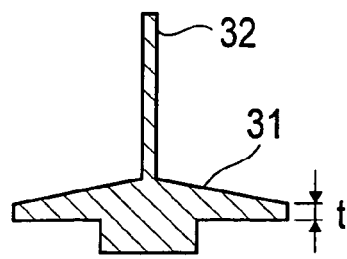
Figure 11D:
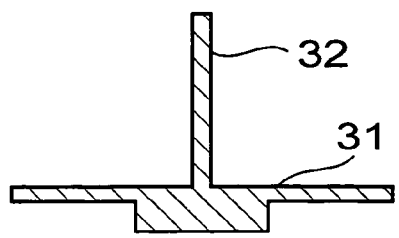

The plug means shown in FIG. 11B has a disk member 31 whose shape is different from FIG. 11A. In order that the coating fluid be uniformly spread over the disk member 31, it is preferred that the thickness of the disk member 31 gradually decrease toward the outer edge. To this end, the upper surface of the disk member 31 over which the coating fluid flows, as viewed in vertical cross section, may be straight as shown in FIG. 11A or curvilinear as shown in FIG. 11B. The outer edge of the disk member is more or less pointed in FIGS. 11A and 11B although the outer edge may have a vertical face as shown in FIG. 1C. The outer edge of the disk member 31 should preferably have a thickness t of 0.4 mm or less. If the outer edge has too large a thickness, the coating fluid may not be smoothly transferred from the disk member to the disk substrate, resulting in the resin layer being unevenly coated. In a further alternative, the disk member 31 has a flat surface or a uniform thickness, preferably within the above range, as shown in FIG. 1D.

In the plug means used herein, the support shaft 32 in proximity to the disk member 31 has a minimum diameter of preferably less than 4 mm, more preferably up to 2 mm. If the diameter of the support shaft 32 in proximity to the disk member 31 is too large, the coating start position is spaced apart from the center of the disk member 31, resulting in the resin layer 51 having a large thickness variation in a radial direction. However, if the diameter of the support shaft 32 in proximity to the disk member 31 is too small, the support shaft 32 becomes mechanically weak. For this reason, the minimum diameter of the support shaft 32 should preferably be at least 0.5 mm, more preferably at least 0.7 mm. The length of the support shaft 32 is not critical and may be determined as appropriate for ease of feed of the coating fluid to the outer periphery of the support shaft and ease of handling as by clamping. An appropriate length is about 5 to 100 mm, more preferably about 10 to 30 mm. If the support shaft 32 is too short, difficulty may arise at feeding the coating fluid to the outer periphery and clamping the shaft. Too long a support shaft 32 is cumbersome to handle.

The diameter of the disk member 31 should be larger than the diameter of the center hole 101 in the disk substrate 100 and smaller than the inner diameter of the annular information recording area on the supporting substrate. It is preferred that the diameter of the disk member 31 is at least 4 mm, especially at least 8 mm larger than the diameter of the center hole 101 because the coating fluid 5 can otherwise penetrate below the disk member 31 to contaminate the inner peripheral surface region of the disk substrate 100 circumscribing the center hole 101. Since detachment of the disk member 31 can often cause disturbances to the shape of the resin layer 51 located nearby, it is preferred that the diameter of the disk member 31 is at least 3 mm, especially at least 5 mm smaller than the inner diameter of the annular information recording area. Although the specific size of the disk member 31 depends on the diameter of the center hole and the inner diameter of the annular information recording area, the disk member 31 preferably has a diameter in the range of 20 to 40 mm, especially 25 to 38 mm, when the invention is applied to optical disks having a diameter of about 60 to 130 mm.

Any desired material may be used to construct the plug means. A choice may be made among metals, resins and ceramics as well as composite materials thereof. The disk member 31 and the support shaft 32 may be formed of the same material or different materials. Preferably, the plug means is constructed of metals by reasons of mechanical strength, durability and dimensional precision. Useful metals are stainless steel, aluminum and aluminum alloys.

The surface of the plug means 3, especially the entire surface of the disk member 31 should preferably have a lower surface tension than the coating fluid. If the surface of the plug means 3 is least wettable with the coating fluid, it becomes easy to wash coating fluid deposits away from the plug means. The surface tension can be controlled by selecting an appropriate material to construct the plug means. Alternatively and preferably, water and oil repellent treatment such as Teflon® coating is carried out on the region where surface tension is to be reduced.

Now the optical information medium of the invention is described.

The supporting substrate 120 (FIG. 12) is provided to maintain rigidity for the medium. The supporting substrate 120 generally has a thickness of 0.2 to 1.2 mm, preferably 0.4 to 1.2 mm and may be either transparent or opaque. The supporting substrate 120 is usually constructed of a resin like conventional optical recording media although glass may also be used for the substrate. Grooves 121 are generally formed in optical recording media. Such grooves are obtained by forming grooves in the supporting substrate 120 and transferring the grooves to the layers deposited thereon. The grooves 121 are (depressed) regions located closer to the incident side of recording/reading laser beam, with (raised) regions interposed between adjacent grooves serving as lands.

The light-transmitting layer 102 has a sufficient transparency for laser beam to pass therethrough. The light-transmitting layer preferably has a thickness in the range of 30 to 300 μm. The benefits of the invention become more outstanding when such a thin light-transmitting layer is provided. If the light-transmitting layer is thinner than the range, dust and debris depositing thereon can have detrimental optical effects. If the light-transmitting layer is too thick, it may be difficult to achieve a high recording density by an increase of NA. It is noted that the thickness of the light-transmitting layer is an average of minimum and maximum thicknesses in a region corresponding to the information recording area.

EXAMPLE

Examples of the invention are given below by way of illustration and not by way of limitation.

Example 1

First Embodiment

A read-only optical disk sample was fabricated as follows.
A disk-shaped supporting substrate having information-storing pits formed in its surface was molded from polycarbonate to an outer diameter of 120 mm, an inner diameter (center hole diameter) of 15 mm and a thickness of 1.2 mm. On the pit-formed surface of the substrate, a reflective layer of aluminum was deposited by sputtering.

Next, a light-transmitting layer was formed thereon by the following procedure according to the first embodiment of the invention. The plug means used was configured as shown in FIG. 1 and included a disk member 31 having a diameter of 38 mm and a support shaft 32 having a diameter of 1 mm and a length of 20 mm, both formed of stainless steel.

While the rotating table was rotated at 60 rpm, a UV curable resin (SD301 by Dainippon Ink & Chemicals, Inc., viscosity 500 centipoise at 25° C.) was fed to the outer periphery of the support shaft 32. Then the rotating table was rotated at 800 rpm for 5 seconds whereby the resin was cast over the surface of the reflective layer to form a resin layer. The plug means was removed from the disk substrate. After 2 seconds, the resin layer was exposed to UV radiation for curing into a light-transmitting layer. An optical disk sample was obtained in this way. For the duration from the removal of the plug means to the completion of curing, the disk substrate was kept stationary. The steps from spin coating to curing were carried out in a clean room at 25° C.

For this disk sample, the thickness of the light-transmitting layer was measured using a laser focus displacement meter. It was found that the inner periphery of the light-transmitting layer was continuously built up to form an annular raised rim of an arcuate cross-sectional profile. The annular raised rim had a height of 20 µm from the lowest surface of the light-transmitting layer near the annular raised rim and a width of 1.8 mm. In the disk sample region whose radius ranges from 23 mm to 58 mm, corresponding to the information recorded area, the light-transmitting layer had a thickness within the range of 97±2 µm, indicating a minimized radial thickness variation.

Example 2

First Embodiment

An optical disk sample was fabricated as in Example 1 except that the UV curable resin was K2009 (by Nippon Kayaku Co., Ltd., viscosity 2,500 centipoise at 25° C.), and spin coating was done at 2,500 rpm for 4 seconds. The sample was measured as in Example 1. It was found that an annular raised rim was formed as in Example 1. The annular raised rim had a height of 30 µm from the lowest surface of the light-transmitting layer near the annular raised rim and a width of 2 mm. In the disk sample region whose radius ranges from 23 mm to 58 mm, corresponding to the information recorded area, the light-transmitting layer had a thickness within the range of 78±2 µm, indicating a minimized radial thickness variation.

Example 3

First Embodiment

An optical disk sample was fabricated as in Example 1 except that the plug means illustrated in FIG. 11A was used. In this plug means, the support shaft 32 had a diameter of 0.7 mm at its junction to the disk member 31. The sample was measured as in Example 1. It was found that an annular raised rim was formed as in Example 1. The annular raised rim had a height of 20 µm from the lowest surface of the light-transmitting layer near the annular raised rim and a width of 1.8 mm. In the disk sample region whose radius ranges from 23 mm to 58 mm, corresponding to the information recorded area, the light-transmitting layer had a thickness within the range of 98±1 µm, indicating a less radial thickness variation than in Example 1.

Example 4

First Embodiment

An optical disk sample was fabricated as in Example 1 except that after removal of the plug means from the supporting substrate, UV radiation was irradiated to the resin layer to form the light-transmitting layer while the rotating table was rotated at 100 rpm. The rotating table was continuously rotated at 100 rpm until the curing of the light-transmitting layer was completed.

The sample was measured as in Example 1. It was found that an annular raised rim was formed as in Example 1. The annular raised rim had a height of 24 µm from the lowest surface of the light-transmitting layer near the annular raised rim and a width of 1.8 mm. In the disk sample region whose radius ranges from 23 mm to 58 mm, corresponding to the information recorded area, the light-transmitting layer had a thickness within the range of 97±2 µm, indicating a minimized radial thickness variation.

Example 5

Second Embodiment

An optical disk sample was fabricated as in Example 2 except the following changes. The plug means 3 illustrated in FIG. 8 was used. The mask member 34 of the plug means 3 had a radius which was 1 mm larger than the radius of the disk member 31. In spreading the UV curable resin, spin coating was performed at 2,500 rpm for 5 seconds, and UV radiation was irradiated for the final 1 second (first curing step). Then the plug means 3 was removed. With the disk substrate 100 kept stationary, UV radiation was irradiated for 1 second over the entire surface of the resin layer 51 as shown in FIG. 9 (second curing step).

The sample was measured as in Example 1. It was found that an annular raised rim was formed as in Example 1. The annular raised rim had a height of 150 µm from the lowest surface of the light-transmitting layer near the annular raised rim and a width of 2 mm. In the disk sample region whose radius ranges from 23 mm to 58 mm, corresponding to the information recorded area, the light-transmitting layer had a thickness within the range of 75±2 µm, indicating a minimized radial thickness variation.

Comparative Example 1

An optical disk sample was fabricated as in Example 1 except that the plug means was not used and the resin was fed to the disk substrate at a radius of 19 mm. The sample was measured as in Example 1. It was found that no annular raised rim was formed. In the disk sample region whose radius ranges from 23 mm to 58 mm, corresponding to the information recorded area, the light-transmitting layer had a thickness within the range of 75±20 µm. The thickness difference between the inner and outer perimeters was as large as 40 µm.

Comparative Example 2

An optical disk sample was fabricated as in Comparative Example 1 except that spin coating was done at 800 rpm for 3 seconds. The sample was measured as in Example 1. It was found that no annular raised rim was formed. In the disk sample region whose radius ranges from 23 mm to 58 mm, corresponding to the information recorded area, the light-transmitting layer had a thickness within the range of 96±25 µm. The average between maximum thickness and minimum thickness of the light-transmitting layer within the measured region was approximately equal to Example 1, but the thickness difference between the inner and outer perimeters was as large as 50 µm.

Comparative Example 3

An optical disk sample was fabricated as in Example 2 except that the plug means was not used and the resin was fed to the disk substrate at a radius of 19 mm. The sample was measured as in Example 1. It was found that no annular raised rim was formed. In the disk sample region whose radius ranges from 23 mm to 58 mm, corresponding to the information recorded area, the light-transmitting layer had a thickness within the range of 60±17 µm. The thickness difference between the inner and outer perimeters was as large as 34 µm.

Stack Test

Using a pin stocker, 100 disk samples of each of Examples 1 to 5 and Comparative Example 1 were stacked for storage. After 24 hours of storage, the disk sample situated at the bottom of the stack was taken out and the surface of its light-transmitting layer was inspected. For the stack of disk samples of Comparative Example 1, the light-transmitting layer was adhered to the overlying disk sample, and after peeling, contact traces were found on the surface of the light-transmitting layer. For the stack of disk samples of each of Examples 1 to 5, the light-transmitting layer was not adhered to the overlying disk sample, and no contact traces were found thereon.

The disk sample of each of Examples 1 to 5 and Comparative Example 1 was rested on a desk with its light-transmitting layer faced down. The sample was slid several strokes on the desk before the surface of the light-transmitting layer was inspected. No flaws were found on the samples of Examples 1 to 5 whereas flaws were found on the sample of Comparative Example 1.

Japanese Patent Application Nos. 2000-174541 and 2001-148523 are incorporated herein by reference.

Reasonable modifications and variations are possible from the foregoing disclosure without departing from either the spirit or scope of the present invention as defined by the claims.

What is claimed is:

1. A method for preparing an optical information medium including a disk-shaped supporting substrate having a center hole, an annular information recording area thereon, and an annular resin-based light-transmitting layer on the information recording area by which recording/reading laser beam is transmitted, said light-transmitting layer terminating at a radially inner periphery which forms an annular raised rim, comprising the steps of:

mounting a substrate in the form of the supporting substrate having the information recording area thereon on a rotating table, closing the center hole with a plug means having a disk member, feeding a coating fluid containing a resin onto the disk member, and thereafter rotating the substrate together with the plug means to spread the coating fluid over the substrate to form the annular resin layer, removing the plug means from the substrate, the resin layer being built up at the radially inner periphery thereof to form the annular raised rim, and then curing the resin layer to form the light-transmitting layer.

2. The method of claim 1 wherein in the step of removing the plug means from the substrate, the resin layer has a viscosity of 500 to 100,000 centipoise.

3. The method of claim 1 wherein the step of curing the resin layer is started within 0.5 to 10 seconds from the step of removing the plug means from the substrate.

4. The method of claim 1 wherein the substrate is kept stationary for the duration from the step of removing the plug means from the substrate to the completion of the step of curing the resin layer.

5. The method of claim 1 wherein the substrate is rotated at a rotational speed of up to 120 rpm for at least a portion of the duration from the step of removing the plug means from the substrate to the completion of the step of curing the resin layer.

6. A method for preparing an optical information medium including a disk-shaped supporting substrate having a center hole, an annular information recording area thereon, and an annular resin-based light-transmitting layer on the information recording area by which recording/reading laser beam is transmitted, said light-transmitting layer terminating at a radially inner periphery which forms an annular raised rim, the method comprising:

the step of mounting a substrate in the form of the supporting substrate having the information recording area thereon on a rotating table, closing the center hole with a plug means having a disk member, feeding a coating fluid containing an actinic radiation-curable resin onto the disk member, and thereafter rotating the substrate together with the plug means to spread the coating fluid over the substrate to form the annular resin layer, the first curing step of irradiating actinic radiation to the resin layer for curing except a region thereof surrounding the radially inner periphery thereof, while the substrate is being rotated together with the plug means, the rotation of the plug means causing a portion of the resin on the disk member of the plug means to move toward the inner periphery of the resin layer whereby the resin layer is built up at the inner periphery thereof to form the annular raised rim, the step of removing the plug means from the substrate, and the second curing step of irradiating active radiation to at least the region of the resin layer surrounding the inner periphery thereof for curing to form the light-transmitting layer.

7. The method of claim 6 wherein said plug means further includes a support shaft having one end integrally joined to the disk member at its center and another end, and a circular mask member integrally joined to the support shaft near the other end and concentrically with the disk member and having a larger radius than the disk member, said mask member serving to shield the actinic radiation irradiated in the first curing step.

* * * * *